Aug. 3, 1965       C. BRUANT ETAL       3,199,036
CIRCUITS FOR GENERATING WAVE TRAINS
Filed July 5, 1961                        2 Sheets-Sheet 1

INVENTORS
CLAUDE PIERRE EMILE BRUANT
EDMOND CHARLES GUSTAVE CRAMPON
JACQUES MARTINAT
BY Robertson & Smythe
ATTORNEYS 3,199,036
CIRCUITS FOR GENERATING WAVE TRAINS
Claude Bruant and Edmond Crampon, Montrouge, and Jacques Martinat, Fresnes, France, assignors to Societe Alsacienne de Constructions Mecaniques, Paris, France, a corporation of France
Filed July 5, 1961, Ser. No. 121,955
Claims priority, application France, Aug. 8, 1960, 835,280
6 Claims. (Cl. 328—67)

The present invention relates to improvements in power transmitters, and especially in those which operate in the range of sonic and ultra-sonic waves.

Up to the present time, vacuum tubes have normally been employed in the conventional circuits. The characteristics of these tubes do not in general permit of the passage of a very large current and the transmitter outputs are therefore limited.

It is known that for electro-magnetic detection, thyratrons are currently used to deliver large currents for very short times, but it has never been envisaged to make use of this principle for the generation of wave-trains. This abstention is due to the major drawback that the extinction of a fully excited thyratron is difficult to effect. Furthermore, the advantages of thyratrons with respect to vacuum tubes are well known: they have a very low grid-driving power, a high output and a small voltage drop at the terminals, which becomes even extremely small in the case of controlled semi-conductor rectifiers which latter, in the form of conventional junction diodes, are provided with an additional striking electrode, which normally have a very large impedance between anode and cathode but which, with a suitable excitation, can be triggered into a condition such that they have exactly the same characteristics as an ordinary diode.

In the present specification, it will be understood that wherever the term "thyratron(s)" is used, the term "controlled semi-conductor rectifier(s)" can be substituted.

The applicants have sought to make use of the above-mentioned properties of thyratrons and controlled semi-conductor rectifiers in the construction of power transmitters working in the range of sonic and ultra-sonic waves. To this end, they have had the idea of making simultaneous use of delay lines in order to ensure the extinction of the thyratrons. The properties of these lines will be first of all briefly recalled below.

Considering a delay line L (FIG. 1) having an impedance Z and connected to a source of voltage E through the intermediary of a switch I, it is known that:

(1)

(a) If $Z=Z_c$ (where $Z_c$ is the characteristic impedance of the line), at a time $\theta$ after the closure of the switch I, the line L is charged by the voltage E and there can be collected at the terminals of the impedance Z a square-top voltage wave of amplitude $E/2$ and a duration $\theta$;

(b) If Z is less than $Z_c$, at the end of the time $\theta$ the line is charged by a voltage greater than E and there is collected at the terminals of the impedance Z a square-topped voltage wave having an amplitude less than $E/2$;

(c) If $Z=0$, which represents the limiting case, the line is charged by the voltage 2E.

It is clear that in cases (b) and (c), if the circuit is not opened between times, an oscillatory condition is established and at the end of a certain time, the voltage at the terminals of the line becomes equal to E.

(2)

If (FIG. 2) a previously charged line L is connected to an impedance Z:

(a) When $Z=Z_c$, there is collected at the terminals of Z a square-topped voltage wave of amplitude $E/2$ and duration $\theta$, and the line is completely discharged at the end of the time $\theta$;

(b) When Z is less than $Z_c$, as in the case (1)(b) above, the flat-topped voltage wave obtained at the terminals of Z has an amplitude less than $E/2$ and the line is not completely discharged, but the voltage at its terminals has changed in sign;

(c) In the limit (if $Z=0$), the line is not discharged at all, but the voltage at its terminals is equal to $-E$. As before, in the cases (b) and (c), the circuit must be opened at the end of the time $\theta$, otherwise the line will be completely discharged at the end of a certain time.

Taking these properties into account, if a delay line $L_1$ (FIG. 3) is inserted in the supply circuit of a thyratron charged through an impedance $Z_1$, at a time $\theta$ after its excitation, the thyratron $T_1$ will be blocked because the voltage at its terminals becomes zero (if $Z_1=Z_c$) or negative (if $Z_1$ is less than $Z_c$). Furthermore, a flat-topped wave of duration $\theta$ is obtained at the terminals of the impedance $Z_1$. However, the line $L_1$ has been charged during the time $\theta$, and it is only possible to repeat the operation if it is discharged in the meantime. The basic idea of the present invention is to utilize this delay line $L_1$ thus charged, as a source of supply of a second thyratron $T_2$ and an impedance $Z_2$ (FIG. 4). The extinction of $T_2$ after the time $\theta$ will be ensured by the method described above, a square-topped voltage wave will be obtained at the terminals of the impedance $Z_2$, and the line $L_1$ will be discharged. At this moment, it will be possible to effect a fresh extinction of the thyratron $T_1$ and then of the thyratron $T_2$, etc.

In other words, it becomes possible to generate a series of square-topped voltage waves at the terminals of the impedances $Z_1$ and $Z_2$, by exciting in succession the striking electrodes of the thyratrons $T_1$ and $T_2$; this series of square-topped waves may be considered as a wave-train.

Under these conditions, the present invention relates in the first place to a method of transmission which consists fundamentally, with the object of obtaining a train of voltage waves, in alternately exciting thyratrons, the extinction of which is effected by means of a delay line. This method is particularly suitable to power transmission, since the currents delivered by the thyratrons may attain 1,000 amperes.

The invention also concerns a circuit which serves to carry the above method into effect, and which essentially comprises, with an appropriate source of current, at least one elementary circuit constituted by two thyratrons and a delay line, the relations between the impedances of the delay lines and the load impedances being fixed as a function of the results desired.

The invention finally relates, by way of new industrial products, to the power transmitters or generators in which the above method is carried into effect or which comprise a circuit of the above type. In the case of transmitters or generators according to the invention, the relations between the impedances and also the number of the elementary circuits, are fixed inter alia in dependence on the characteristics which these apparatus are required to have high output, high voltage, operation at high frequency, presence or absence of coupling transformer, more or less small overall dimensions, etc.

The impedances utilized may be equal or different, common or separate. In certain cases, it is even possible to dispense with one of the two impedances $Z_1$ or $Z_2$.

In the accompanying drawings, there have been shown by way of example, various forms of circuit serving to carry into effect the method according to the invention. In these drawings:

FIGS. 1 to 4, inclusive, illustrate the principle upon which the invention rests;

FIG. 5 corresponds to the case of the single circuit with a single impedance;

In FIGS. 1 to 14, there have been shown various types of circuit according to the invention and comprising only one elementary circuit.

Figure 1:
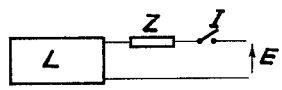
Figure 2:
Figure 3:
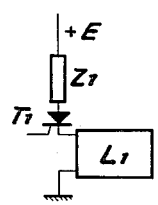
Figure 4:
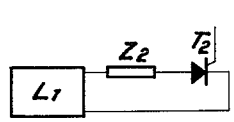
Figure 5:
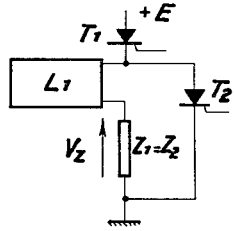
Figure 7:
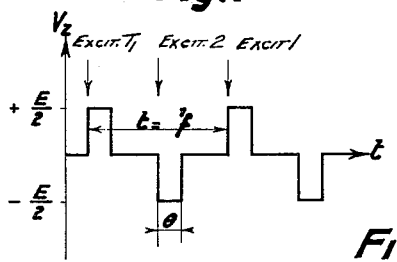
FIG. 7 shows the voltage diagrams obtained with the circuit of FIG. 5.

FIG. 5 corresponds to the case in which the oscillation at the terminals of a single impedance is to be obtained from the terminals and the impedances $Z_1$ and $Z_2$ are combined into one. Thus, for an alternate excitation of the thyratrons $T_1$ and $T_2$ at the frequency $f$, there is obtained at the terminals of the load a train of waves of fundamental frequency $f$, composed of alternately positive and negative square-topped waves having a duration $\theta$ and an amplitude $E/2$ (FIG. 7).

Figure 6:
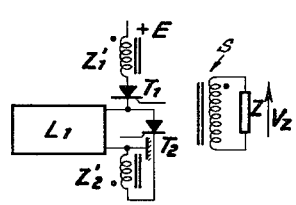
FIG. 6 shows an alternative form comprising the use of a transformer.
Figure 8:
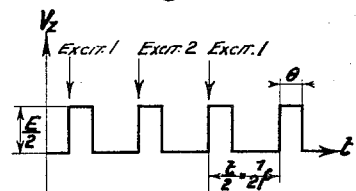
FIGS. 8 and 9 show the diagrams corresponding to two methods of operation of the circuit of FIG. 6.
Figure 9:
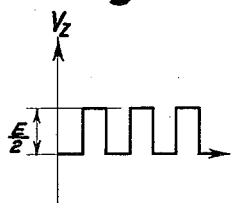

FIG. 6 shows a circuit in which a transformer S transfers into the circuits of the thyratrons $T_1$ and $T_2$, impedances $Z'_1$ and $Z'_2$ equal to $Z_c$ (FIG. 6). With a suitable choice of the direction of the windings of the transformer S, the wave-train obtained for an alternate excitation of $T_1$ and $T_2$ at the frequency $f$ is composed of square-topped waves having the same polarity and an amplitude $E/2$ (if the ratio of the transformer is 1). The fundamental frequency of the wave is $2f$ (FIG. 8). If $2f$ is chosen as being equal to $1/2\theta$, the angle of opening is 180° (FIG. 9), that is to say, a train of square waves is produced. A circuit of this kind offers a particular advantage, especially for transmission of power to the terminals of acoustic vibrators.

It will be noted that the impedances $Z'_1$ and $Z'_2$ of the circuit of FIG. 6 must be real; it is therefore necessary to compensate the transverse inductance of the transformer S, unless this is very much greater than the product $\theta Z_2$. It is also necessary to compensate the impedance Z by any appropriate means, if this impedance is not real, by using for example Petersen circuits or generalized Petersen circuits.

Figure 10:
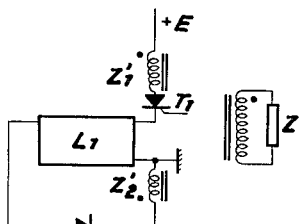
FIG. 10 shows a circuit diagram with a delay line having a repetitive structure.
Figure 11:
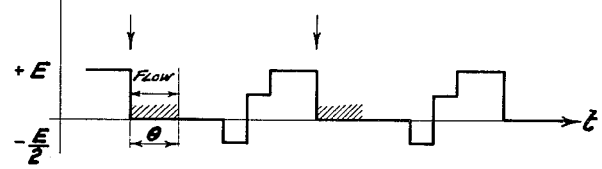
FIGS. 11 to 13 are diagrams showing various operations of the circuit of FIG. 10.
Figure 12:
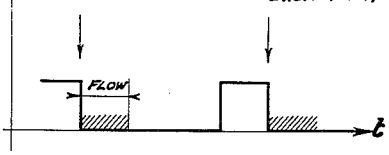
Figure 13:
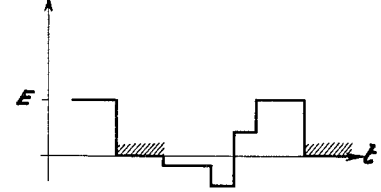

The circuit of FIG. 10 enables the operation of the circuit of FIG. 6 to be substantially improved. To this end, the circuit of FIG. 10 has been provided for the use of the two extremities of a delay line having a repetitive structure. The limitation in frequency is in fact due to the time of de-ionization (with gas thyratrons) or of return (with transistor thyratrons), since a thyratron must not be permitted to re-excite when voltage is re-applied to its anode. Now, it is known that these times are considerably reduced by the presence of negative voltage on the anodes. An examination of the voltages at the terminals of thyratrons shows that in the case where the two extremities are utilized, there exists a period of duration $\theta/2$ in which the anode voltage is negative and equal to $-E/2$ (see FIG. 11), whereas this does not exist in the other case (see FIG. 12).

A further method of increasing the frequency of operation of the circuits according to the invention consists in choosing the impedances so that $Z'_1=Z'_2<Z'_c$. It can be seen from FIG. 13 that, taking account of the above-mentioned properties of delay lines, the duration of application of the negative voltage is then $1.5\theta$, but the amplitude of the square-topped wave is less than $E/2$.

Figure 14:
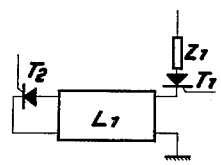
FIG. 14 shows another alternative circuit according to the invention.

Finally, when it is not desired to employ a coupling transformer, one of the two impedances $Z_1$ or $Z_2$ may be made zero. This case is shown in FIG. 14. The wave obtained at the terminals of the single impedance $Z_1$ is of frequency $f$, but its amplitude is equal to E if this impedance is equal to $Z_c$.

If the single impedance is less than $Z_c$, there is obtained a wave of amplitude less than E, but the limiting frequency of operation is considerably increased. In the two cases, the wave produced is absolutely identical with that which would be produced by an oscillator operating in Class C.

The circuits which have been described above enable transmitters to be constructed which work up to 100 kilocycles, utilizing transistor-thyratrons.

It will be observed that it is possible to associate in various ways a certain number of elementary circuits such as those previously described, in order to obtain all desired laws of transmission.

If the excitation of the homologous thyratrons of each circuit is effected at the same time, the power delivered at the load is multiplied by the number of circuits. It is also possible to carry out excitations displaced in time so as to generate the train of waves by successive outputs of the thyratrons. Each thyratron then only supplies one square-topped wave in 2, or in 4, or in $2n$. For each thyratron, the time of rest between two periods of output is thus increased, which enables the limiting frequency and the instantaneous power delivered to be increased.

Figure 15:
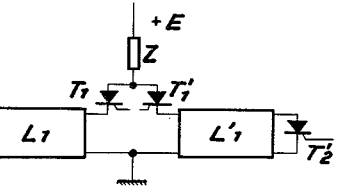
FIG. 15 shows a circuit diagram with a number of elementary circuits.

In the circuit shown in FIG. 15, when the fundamental frequency is $f$, the thyratrons $(T_1-T'_2)$ and $(T'_1-T_2)$ are alternately excited at the frequency $f/2$. The negative potential at the terminals of $T_1$ and $T'_1$ reaches $-E$ for a time $\theta/2$, and that at the terminals of $T_2$ and $T'_2$ attains $-E$ for a time $1.5\theta$.

It should also be noted that it is possible to obtain periods of application of negative potential to the terminals of the thyratrons by a "polarization by common load" of known type.

Finally, if impedances are chosen less than $Z_c$, there is obtained a still higher working frequency, but the amplitude is smaller.

What we claim is:

1. In a wave train generating circuit, the combination including a pair of gating element means, each of said gating element means having a cathode, anode and gate; means for alternately applying a pulse to said gates, so as to render conductive the respective gating element to which the pulse is applied; and energy-storage device having a predetermined characteristic impedance, means for connecting said gating means to said energy-storage device whereby said energy-storage device is charged when one gating element means of said pair in rendered conductive, and whereby said energy-storage device is discharged when the other gating element means is rendered conductive, whereby there is a charging current and a discharging current carried respectively by said gating element means; means for supplying a positive voltage to the anode of one of said gating element means; and load means having an impedance, as seen from said energy-storage device, not greater than the characteristic impedance, connected to produce a pulse for at least every charging current, so as to produce a wave train, said load means being in the anode circuit of one of said gating element means, a first terminal of said energy-storage device being connected to the cathode of said one of said gating element means, a second and a third terminal being respectively connected to the anode and cathode of the other of said gating element means, and a fourth terminal of said energy-storage device being connected to a current return point.

2. The circuit of claim 1, wherein said device is a repetitive structure delay line, and said first and fourth terminals are at one end of said line and said second and third terminals are at the other end of said line.

3. The circuit of claim 2, wherein the impedance of said load means is less than said characteristic impedance.

4. The circuit of claim 1, including first and second pairs of said gating element means and first and second energy-storage devices respectively associated with said first and second pairs of gating element means, and wherein said load means is connected to the anodes of one of said gating element means of each pair, and said means for alternately applying pulses is connected to alternately apply pulses to one gate of said first pair and the second gate of said second pair in alternation with the other gates of the first pair and the first gate of the second pair, said first and second devices having first terminals connected to the cathodes of the first gates of the gating element means of the respective pairs, second and third terminals respectively connected to the anodes and cathodes of said other gating element means of the respective pairs, and fourth terminals connected to a common current return point.

5. The circuit of claim 4, wherein said devices are repetitive structure delay lines, and said first and fourth terminals are at one end of their respective lines and the second and third terminals are at the other end of their respective lines.

6. The circuit of claim 5, wherein the impedance of said load means is less than said characteristic impedance.

References Cited by the Examiner

UNITED STATES PATENTS

| | | | |
|---|---|---|---|
| 2,409,897 | 10/46 | Rado | 328—67 X |
| 2,575,559 | 11/51 | Parkinson | 328—67 |
| 2,575,961 | 11/51 | Ivans | 328—67 |
| 2,596,142 | 5/52 | Gerwin | 328—67 |
| 2,698,900 | 1/55 | Anger | 328—67 |
| 2,862,103 | 11/58 | Chrzanowski | 328—60 |
| 3,015,739 | 1/62 | Manteuffel | 307—88.5 |
| 3,018,385 | 1/62 | O'Berry | 307—88.5 |
| 3,134,049 | 5/64 | Wolfframm | 328—67 X |

ARTHUR GAUSS, *Primary Examiner.*